(12) United States Patent
Kim

(10) Patent No.: US 9,390,714 B2
(45) Date of Patent: Jul. 12, 2016

(54) CONTROL METHOD USING VOICE AND GESTURE IN MULTIMEDIA DEVICE AND MULTIMEDIA DEVICE THEREOF

(75) Inventor: Hyeran Kim, Pyeongtaek-si (KR)

(73) Assignee: LG ELECTRONICS INC., Seoul (KR)

(*) Notice: Subject to any disclaimer, the term of this patent is extended or adjusted under 35 U.S.C. 154(b) by 295 days.

(21) Appl. No.: 13/302,710

(22) Filed: Nov. 22, 2011

(65) Prior Publication Data

US 2012/0127072 A1 May 24, 2012

(30) Foreign Application Priority Data

Nov. 22, 2010 (KR) ........................ 10-2010-0116009

(51) Int. Cl.
*G10L 15/24* (2013.01)
*G10L 15/22* (2006.01)
*G10L 15/32* (2013.01)

(52) U.S. Cl.
CPC ................. *G10L 15/24* (2013.01); *G10L 15/22* (2013.01); *G10L 15/32* (2013.01)

(58) Field of Classification Search
CPC .............. G06F 3/16; G06F 2203/0384; G06F 2203/04808; G06F 3/017; G06F 3/167; G06F 2203/0381
USPC ................................................. 345/156–169
See application file for complete search history.

(56) References Cited

U.S. PATENT DOCUMENTS

| 2002/0024500 A1* | 2/2002 | Howard .................... 345/158 |
| 2002/0144259 A1 | 10/2002 | Gutta et al. |
| 2003/0210898 A1* | 11/2003 | Juen et al. ................ 386/117 |
| 2004/0193413 A1* | 9/2004 | Wilson et al. ............. 704/243 |
| 2006/0077174 A1 | 4/2006 | Chung et al. |
| 2009/0167882 A1* | 7/2009 | Chen et al. ................ 348/222.1 |
| 2009/0178011 A1* | 7/2009 | Ording et al. ............. 715/863 |
| 2009/0213421 A1* | 8/2009 | Kato et al. ................ 358/1.15 |
| 2010/0207875 A1* | 8/2010 | Yeh ........................... 345/156 |
| 2011/0252374 A1* | 10/2011 | Chaudhri ................... 715/835 |

FOREIGN PATENT DOCUMENTS

| CN | 2627634 Y | 7/2004 |
| EP | 0 594 129 A2 | 4/1994 |

(Continued)

OTHER PUBLICATIONS

Sharon Oviatt et al.; "Mutual Disambiguation of Recognition Errors in a Multimodal Architectrure"; CHI 99; XP-000894265; May 15-20, 1999; 8 pages.

*Primary Examiner* — Michael Faragalla
(74) *Attorney, Agent, or Firm* — Birch, Stewart, Kolasch & Birch, LLP

(57) ABSTRACT

A multimedia device and a method for controlling the same are disclosed, in which voice and gesture of a user are recognized by the multimedia device to allow the user to execute a desired operation. The method Includes enabling an input of a remote controller input of a gesture and a voice; receiving user the gesture and the voice through the remote controller; identifying a first command associated with the received gesture; identifying a second command associated with the received voice; comparing the first command and the second command to each other; and performing a function associated with the first or second command when the comparing step indicates that the first command corresponds to the second command. The multimedia device executes the operation desired by the user.

11 Claims, 12 Drawing Sheets

(56) References Cited

FOREIGN PATENT DOCUMENTS

| | | |
|---|---|---|
| JP | 2004-526374 A | 8/2004 |
| KR | 10-2002-0070490 A | 9/2002 |
| KR | 10-2007-0090645 A | 9/2007 |
| KR | 10-2008-0052398 A | 6/2008 |
| KR | 10-0918094 B1 | 9/2009 |
| KR | 10-2010-0032699 A | 3/2010 |
| WO | WO 02/43391 A1 | 5/2002 |
| WO | WO 2010/129679 A1 | 11/2010 |

* cited by examiner (a)

(b)

CONTROL METHOD USING VOICE AND GESTURE IN MULTIMEDIA DEVICE AND MULTIMEDIA DEVICE THEREOF

CROSS REFERENCE TO RELATED APPLICATION

This application claims priority to and the benefit of Korean Patent Application No. 10-2010-0116009, filed on Nov. 22, 2010, the disclosure of which is hereby incorporated by reference.

BACKGROUND OF THE INVENTION

1. Field of the Invention

Embodiments of the invention relate to a multimedia device and a method for controlling the same, and more particularly, to a multimedia device and a method for controlling the same, in which voice and gesture of a user are recognized by the multimedia device to allow the user to execute a desired operation, whereby convenience of the user can be improved.

2. Discussion of the Related Art

A multimedia device is an apparatus having a function for receiving and processing broadcast video, for example, which can be viewed by a user. The multimedia device displays broadcasting selected by the user from broadcast signals transmitted from a broadcasting station. The worldwide tendency in multimedia devices is currently towards digital broadcasting from analog broadcasting.

Digital broadcasting refers to broadcasting for transmitting digital image and audio signals. Since digital broadcasting is more robust to external noise than analog broadcasting, it causes little data loss, is more favorable for error correction, has high resolution, and provides a more definite picture image. Also, digital broadcasting enables bidirectional services unlike analog broadcasting.

Also, in order to use the digital broadcasting, the multimedia device has been recently equipped with high performance and multiple-functions as compared with the existing multimedia device. Also, the multimedia device could provide various services such as Internet service, video on demand (VOD) service, and electronic album service.

However, as various functions and services are available in the multimedia device, the user has inconvenience in that the user should perform manipulation of several steps to use a desired function. Accordingly, it has been required that a user interface means should be improved. As a result, a method for controlling a multimedia device through gesture of a user has been developed. However, this problem has a problem in that exact gesture of the user is not recognized or a command corresponding to the recognized gesture is not searched accurately.

SUMMARY OF THE INVENTION

Accordingly, the invention is directed to a multimedia device and a method for controlling the same, which substantially obviate one or more problems due to limitations and disadvantages of the related art.

An object of the invention is to provide a multimedia device and a method for controlling the same, in which the multimedia device is controlled by voice and gesture of a user to improve convenience of the user.

Another object of the invention is to provide a multimedia device and a method for controlling the same, in which exactness in recognizing gesture of a user is improved to improve convenience of the user.

Other object of the invention is to provide a multimedia device and a method for controlling the same, in which various user interfaces for exactness in recognizing gesture of a user can be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a multimedia device includes the steps of enabling an input of a remote controller input of a gesture and a voice; receiving user the gesture and the voice through the remote controller; identifying a first command associated with the received gesture; identifying a second command associated with the received voice; comparing the first command and the second command to each other; and performing a function associated with the first or second command when the comparing step indicates that the first command corresponds to the second command.

In another aspect of the invention, a multimedia device that can be controlled by a remote controller includes a user interface module configured to receive a gesture and a voice; a memory module configured to store a first command and a second command; and a control module configured to identify the first command associated with the received gesture, identify the second command associated with the received voice, compare the first command and the second command to each other, and perform a function associated with the first or second command when the comparison indicates that the first command corresponds to the second command.

In other aspect of the invention, a remote controller that can control a multimedia device includes a wireless communication module configured to transmit and receiving data to and from the multimedia device; a sensing module configured to receive a gesture and a voice; a memory module configured to store a first command and a second command; and a control module configured to identify the first command associated with the received gesture, identify the second command associated with the received voice, compare the first command and the second command to each other, and perform a function associated with the first or second command when the comparison indicates that the first command corresponds to the second command.

According to one embodiment of the invention, the multimedia device executes the operation desired by the user by exactly recognizing gesture and voice of the user, whereby the user can manipulate the multimedia device quickly and exactly.

According to another embodiment of the invention, since the multimedia device can provide various user interfaces in recognizing gesture and voice of the user, convenience of the user can be improved.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the invention, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but do not have meanings or roles discriminated from each other. The suffixes "module" and "unit" may be used together.

A multimedia device described in this specification corresponds to an intelligent multimedia device that additionally provides a computer support function in addition to a broadcasting receiving function. Accordingly, the multimedia device may be provided with a more convenient interface such as a manual input unit, a touch screen or a spatial remote controller. Also, the multimedia device enables e-mailing, web browsing, banking or game playing by accessing the Internet or a computer in accordance with the support of wire or wireless Internet function. For these various functions, a standardized general-purpose operating system (OS) may be used.

Accordingly, since the multimedia device may freely be provided with or without various applications on a general-purpose OS kernel, it may perform various user-friendly functions. More detailed examples of the multimedia device include a network TV, a Hybrid Broadcast Broadband TV (HbbTV), and a smart TV. The multimedia device may be applied to a smart phone as the case may be.

Moreover, the embodiments of the invention will now be described in detail with reference to the accompanying drawings and the disclosure illustrated in the accompanying drawings. However, it is to be understood that the invention is not limited to or restricted by the following embodiments.

Although the terms used in the invention are selected from generally known and used terms considering their functions in the invention, the terms may be modified depending on intention of a person skilled in the art, practices, or the advent of new technology. Also, in special cases, the terms mentioned in the description of the invention may be selected by the applicant at his or her discretion, the detailed meanings of which are described in relevant parts of the description herein. Accordingly, the terms used herein should be understood not simply by the actual terms used but by the meaning within the context and the description disclosed herein.

Figure 1:
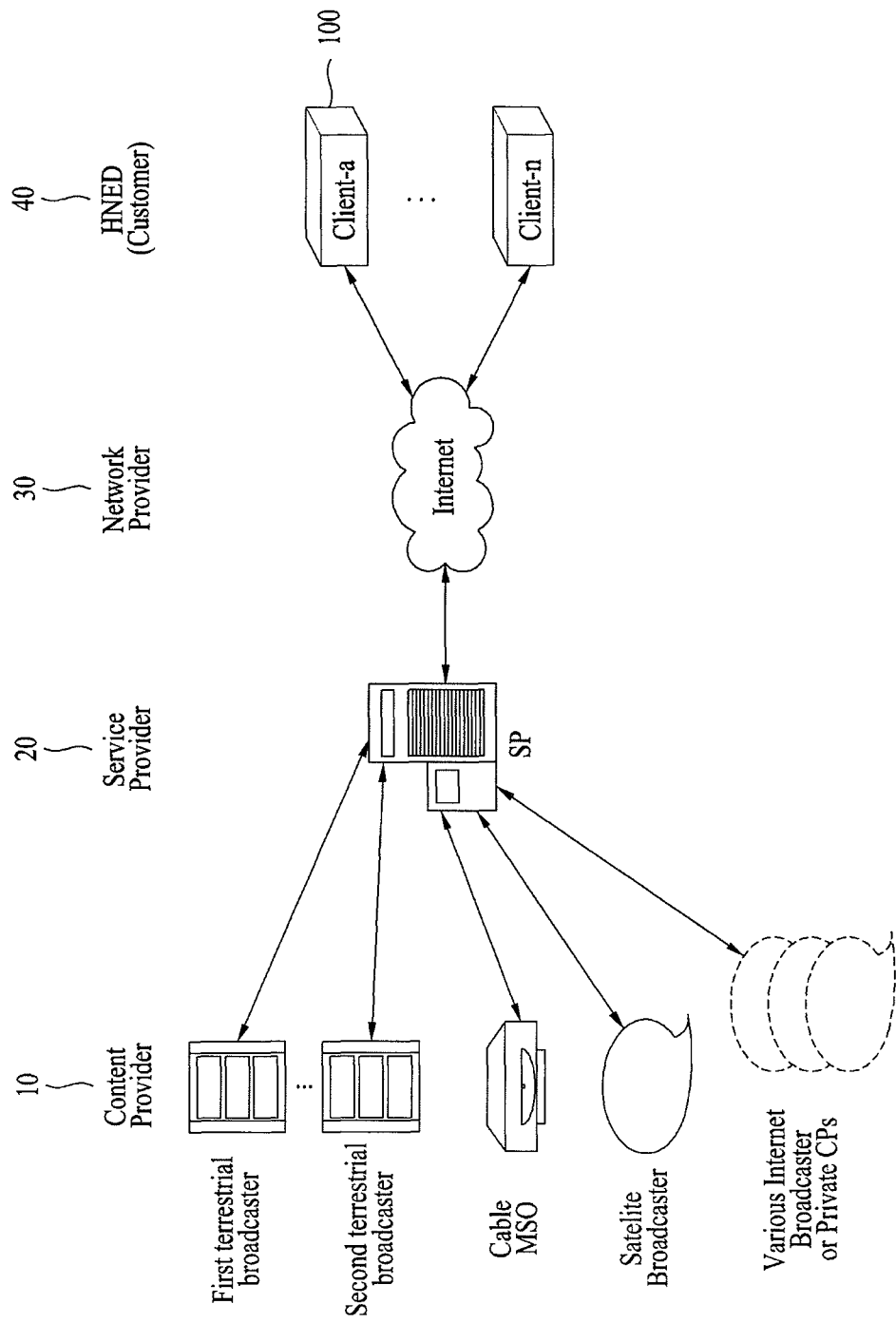
FIG. 1 is a diagram illustrating an example of a broadcast system that includes a multimedia device according to one embodiment of the invention.

FIG. 1 is a diagram illustrating an example of a broadcast system that includes a multimedia device according to one embodiment of the invention.

As illustrated in FIG. 1, the broadcast system that includes a multimedia device according to one embodiment of the invention includes a content provider (CP) 10, a service provider (SP) 20, a network provider (NP) 30, and a home network end user (HNED) 40. The HNED 40 corresponds to, for example, a client 100 which is a multimedia device according to the embodiment of the invention. The client 100 corresponds to the multimedia device according to the embodiment of the invention, and examples of the multimedia device include a network TV, a smart TV, and an IPTV.

The content provider 10 manufactures or generates various contents and provides them. Examples of the content provider 10 include a terrestrial broadcaster, a cable system operator (SO), a multiple system operator (MSO), a satellite broadcaster, and an Internet broadcaster, as illustrated in FIG. 1.

Also, the content provider 10 may provide various applications in addition to broadcast contents. This will be described later in more detail.

The service provider 20 may provide contents provided by the content provider 10 by service-packaging them. For example, the service provider 20 of FIG. 1 may package first terrestrial broadcasting, second terrestrial broadcasting, cable MSO, satellite broadcasting, various kinds of Internet broadcasting, application, etc., and provide the packaged one to a user.

The service provider 20 may provide a service to the client 100 by using a unicast or multicast mode. The unicast mode is to transmit data between a single transmitter and a single receiver 1:1 (one to one). In an instance of the unicast mode, for example, if the receiver requests a server to transmit data, the server may transmit data to the receiver in accordance with the request. The multicast mode is to transmit data to a plurality of receivers of a specific group. For example, the server may transmit data to a plurality of receivers, which are previously registered therewith, at one time. For this multicast registration, IGMP (Internet Group Management Protocol) may be used.

The network provider 30 may provide a network for providing a service to the client 100. The client 100 may construct a home network end user (HNED) to receive a service.

Conditional access or content protection may be used to protect contents which are transmitted from the system of the aforementioned multimedia device. For conditional access or content protection, a cable card or downloadable conditional access system (DCAS) may be used.

The client 100 may provide contents through the network. In this instance, the client 100 may be a content provider contrary to the above. The content provider 10 may receive contents from the client 100. In this instance, it is advantageous in that bidirectional content service or data service is available.

Figure 2:
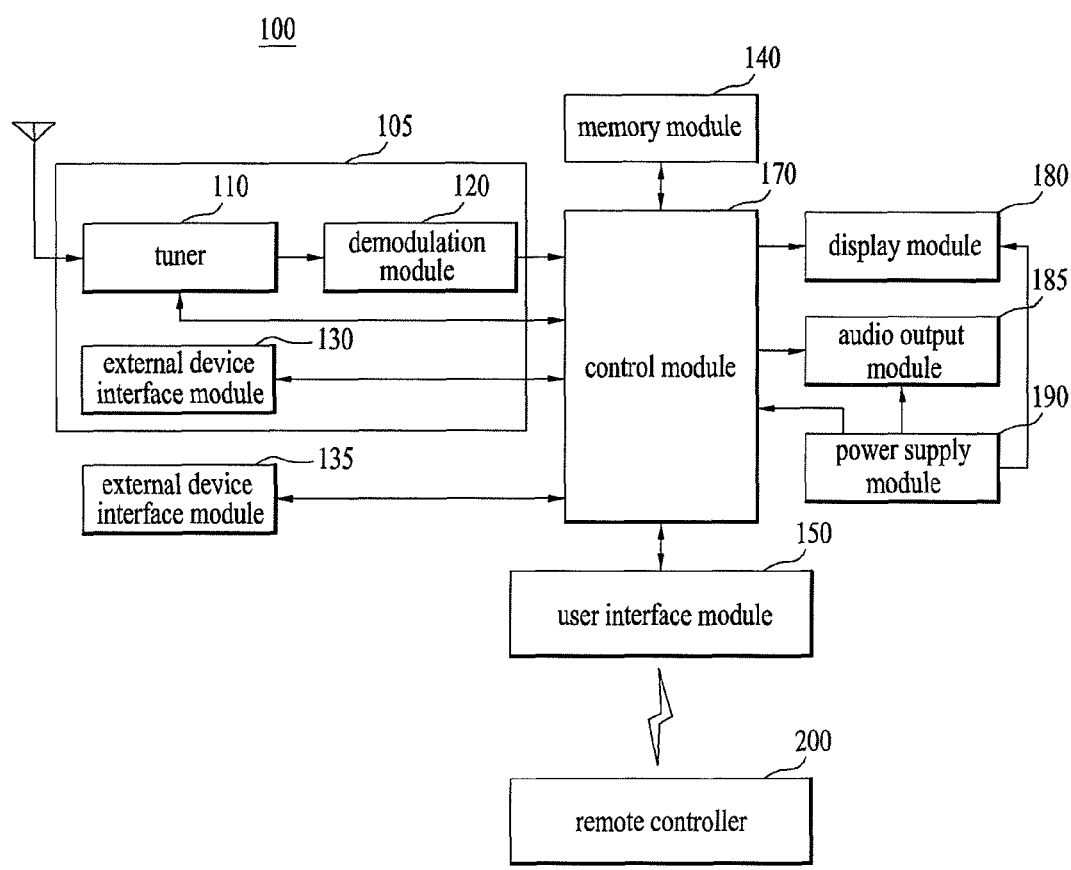
FIG. 2 is a detailed diagram illustrating an example of a multimedia device illustrated in FIG. 1.

FIG. 2 is a detailed diagram illustrating an example of a multimedia device illustrated in FIG. 1.

Referring to FIG. 2, the multimedia device 100 according to one embodiment of the invention includes a broadcasting receiving module 105, an external device interface module 135, a memory module 140, a user interface module 150, a control module 170, a display module 180, an audio output module 185, a power supply module 190, and a camera module. The broadcasting receiving module 105 includes a tuner 110, a demodulation module 120, and a network interface module (or an external device interface module) 130. The broadcasting receiving module 105 may be designed to include the tuner 110 and the demodulation module 120 without the network interface module 130 if necessary. On the other hand, the broadcasting receiving module 150 may be designed to include only the network interface module 130 without the tuner 110 and the demodulation module 120.

The tuner 110 selects one of radio frequency (RF) broadcast signals received through an antenna, which corresponds to a channel selected by a user or all previously stored channels. Also, the tuner 110 converts the selected RF broadcast signal to an intermediate frequency signal or a baseband video or audio signal.

Also, the tuner 110 may receive RF broadcast signal of a single carrier based on an advanced television system committee (ATSC) mode or RF broadcast signal of multiple carriers based on a digital video broadcasting (DVB) mode.

The demodulation module 120 may output a stream signal (TS) after performing demodulation and channel decoding.

The stream signal output from the demodulation module 120 may be input to the control module 170. The control module 170 performs demultiplexing, video/audio signal processing, etc., and then outputs video to the display module 180 and audio to the audio output module 185.

The external device interface module 135 may connect an external device with the multimedia device 100.

The external device interface module 135 is connected to the external device such as Digital Versatile Disk (DVD), Blu-ray, game device, camera, camcorder, computer (e.g., notebook computer), etc., through wire/wireless cables. The external device interface module 135 transmits a video, audio, or data signal externally input through the external device connected thereto, to the control module 170 of the multimedia device 100. Also, the external device interface module 135 may output the video, audio or data signal processed by the control module 170 to the external device. To this end, the external device interface module 135 may include an A/V input/output module or a wireless communication module.

The A/V input/output module may include a USB terminal, a composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc., to input video and audio signals of the external device to the multimedia device 100.

The wireless communication module may perform a short-distance wireless communication with other electronic devices. For example, communication standards such as Bluetooth, Radio Frequency Identification (RFID), infrared Data Association (IrDA), Ultra Wideband (UWB), ZigBee, Digital Living Network Alliance (DLNA), etc., may be used for the short-distance wireless communication, whereby network connection between the multimedia device 100 and other electronic devices may be performed.

In addition, the external device interface module 135 may be connected to various set-top boxes through at least one of the above-mentioned various terminals to perform input/output operation with the set-top boxes.

The network interface module 130 provides interface for connecting the multimedia device 100 with wire/wireless networks including Internet network. The network interface module 130 may include an Ethernet terminal, for example, for wire network connection. For example, Wireless LAN (WLAN)(Wi-Fi), Wireless broadband (Wibro), World Interoperability for Microwave Access (Wimax), High Speed Downlink Packet Access (HSDPA) may be used for the wireless network connection.

The network interface module 130 transmits or receives data to and from other users or other electronic devices through a network connected thereto or another network linked on the connected network.

The memory module 140 may store a program for processing and controlling each signal of the control module 170, or may store the processed video, audio or data signal.

Also, the memory module 140 may temporarily store the video, audio or data signal input from the external device interface module 135 or the network interface module 130. The memory module 140 may store information on a predetermined broadcast channel through a channel memory function.

Also, the memory module 140 may store feature information on gesture and voice mapped into a specific command that can be executed in the multimedia device, through a database, and may allow the user to execute the specific command through gesture and voice. The database will be described in more detail with reference to FIG. 12.

For example, the memory module 140 may include a storage medium of at least one type of a flash memory type, a hard disk type, a multimedia card micro type, a card type memory (for example, SD or XD memory), RAM and ROM (EEPROM, etc.) The multimedia device 100 may play contents files (moving picture files, still image files, music files, application files, etc.) stored in the memory module 140 to provide the played contents files to the user.

Although FIG. 2 illustrates that the memory module 140 and the control module 170 are provided separately, the scope of the invention is not limited to the embodiment of FIG. 2. The memory module 140 may be included in the control module 170.

The user input interface module 150 transmits the signal input by the user to the control module 170 or transmits the signal from the control module 170 to the user.

For example, the user interface module 150 may receive and process a control signal such as power on/off, channel selection and screen setup and information on gesture and voice from the remote controller 200 in accordance with various communication modes such as RF communication mode and IR communication mode, or may transmit the control signal from the control module 170 to the remote controller 200.

Also, for example, the user interface module 150 may transmit a control signal input by a local key such as a power key, a channel key, a volume key, and a setup key to the control module 170.

Also, for example, the user interface module 150 may transmit a control signal input by a sensing module, which senses gesture of the user, to the control module 170, or may transmit the signal from the control module 170 to the sensing module. In this instance, the sensing module may include a touch sensor, an audio sensor, a position sensor, an action sensor, etc.

The control module 170 demultiplexes input streams through the tuner 110, the demodulation module 120 or the external device interface module 130 or processes the demultiplexed signals to generate and output a signal for a video and audio output.

The video signal processed by the control module 170 may be input to the display module 180, so that the video signal may be displayed as image corresponding to the video signal. Also, the video signal processed by the control module 170 may be input to the external output device through the external device interface module 135.

The video signal processed by the control module 170 may be output to the audio output module 185. Also, the video signal processed by the control module 170 may be input to the external output device through the external device interface module 135.

Also, if gesture information is received from the remote controller 200 through the user interface module 150 in accordance with the embodiment of the invention, the control module 170 searches for a specific command matched with the received gesture information from the database of the memory module 140. If the searched result exists, the control module 170 may control the database of the memory module 140 to identify whether voice information mapped into the searched specific command is matched with feature information of the input voice based on the voice information received through the user interface module 150. If the voice information mapped into the searched specific command is matched with feature information of the input voice, the control module 170 may perform a control operation to execute the specific command.

Also, in respect of the search operation and the identifying operation of the control module 170, the control module 170 may extract direction information of the gesture input through the user interface module 150, search for a specific command matched with the extracted direction information through the database of the memory module 140, extract waveform information of the voice input through the user interface module 150 and identify whether the extracted waveform information is matched with waveform information of the voice mapped into the searched specific command.

Also, if specific data for enabling the input of the remote controller 200 is received from the remote controller 200 through the user interface module 150, the control module 170 determines a running time when the specific data is received. If the running time exceeds a certain time, the control module 170 may enable the input of the remote controller 200. This will be described in more detail with reference to FIG. 8.

Also, after the multimedia device 100 executes a specific command through a predetermined input, if any loss occurs in the operation currently executed by the multimedia device 100, the control module 170 may output a warning message to the display module 180. The control module 170 may execute the specific command only if a confirmation command on the warning message is received, whereby loss in the operation in progress may be prevented from occurring.

The display module 180 converts the video, data and OSD signals processed by the control module 170 or the video and data signals received from the external device interface module 135 to R, G, B signals, respectively, to generate driving signals.

The audio output module 185 receives the signal audio-processed by the control module 170, for example, stereo signal, 3.1 channel signal or 5.1 channel signal, and outputs the received signal as sound. Various types of speakers may be used as the audio output module 185.

To sense gesture of the user, the multimedia device 100 may further include a sensing module that includes at least one of a touch sensor, an audio sensor, a position sensor, and an action sensor, as described above. The signal sensed by the sensing module may be transmitted to the control module 170 through the user interface module 150. The sensing module may be a part of the multimedia device or the remote controller.

The multimedia device 100 may further include a camera module that takes a user. Image information taken by the camera module may be input to the control module 170.

The control module 170 may sense gesture of the user by using the image taken from the camera module and the signal sensed from the sensing module, respectively or in combination.

The power supply module 190 supplies the corresponding power to the entire portion of the multimedia device 100.

The remote controller 200 transmits a user input to the user interface module 150. To this end, the remote controller 200 may use Bluetooth, Radio Frequency (RF) communication, infrared (IR) communication, Ultra Wideband (UWB), Zig-Bee, etc.

Also, the remote controller 200 may receive the video, audio or data signal output from the user interface module 150 to display the received signal or output audio or vibration.

The aforementioned multimedia device 100 may be a fixed type digital broadcast receiver that can receive at least one of digital broadcasting of ATSC mode (8-VSB mode), digital broadcasting of DVB-T mode (COFDM mode), and digital broadcasting of ISDB-T mode (BST-OFDM mode).

The block diagram of the multimedia device 100 illustrated in FIG. 2 is for one embodiment of the invention. The respective elements of the block diagram may be incorporated, added or omitted depending on options of the multimedia device 100 which is actually implemented. In other words, two or more elements may be incorporated into one element, or one element may be divided into two or more elements, as occasion demands. Also, the function performed by each block is intended for description of the embodiment of the invention, and its detailed action or device does not limit claims of the invention.

Unlike the embodiment illustrated in FIG. 2, the multimedia device 100 may receive and play video contents through the network interface module 130 or the external device interface module 135 without the tuner 110 and the demodulation module 120 illustrated in FIG. 2.

The multimedia device 100 is an example of a video processor that performs signal processing of video stored therein or input video. Other examples of the video signal processor include a set-top box that excludes the display module 180 and the audio output module 185 illustrated in FIG. 2, the aforementioned DVD player, a blu-ray player, a game device, and a computer, as well as others.

Figure 3:
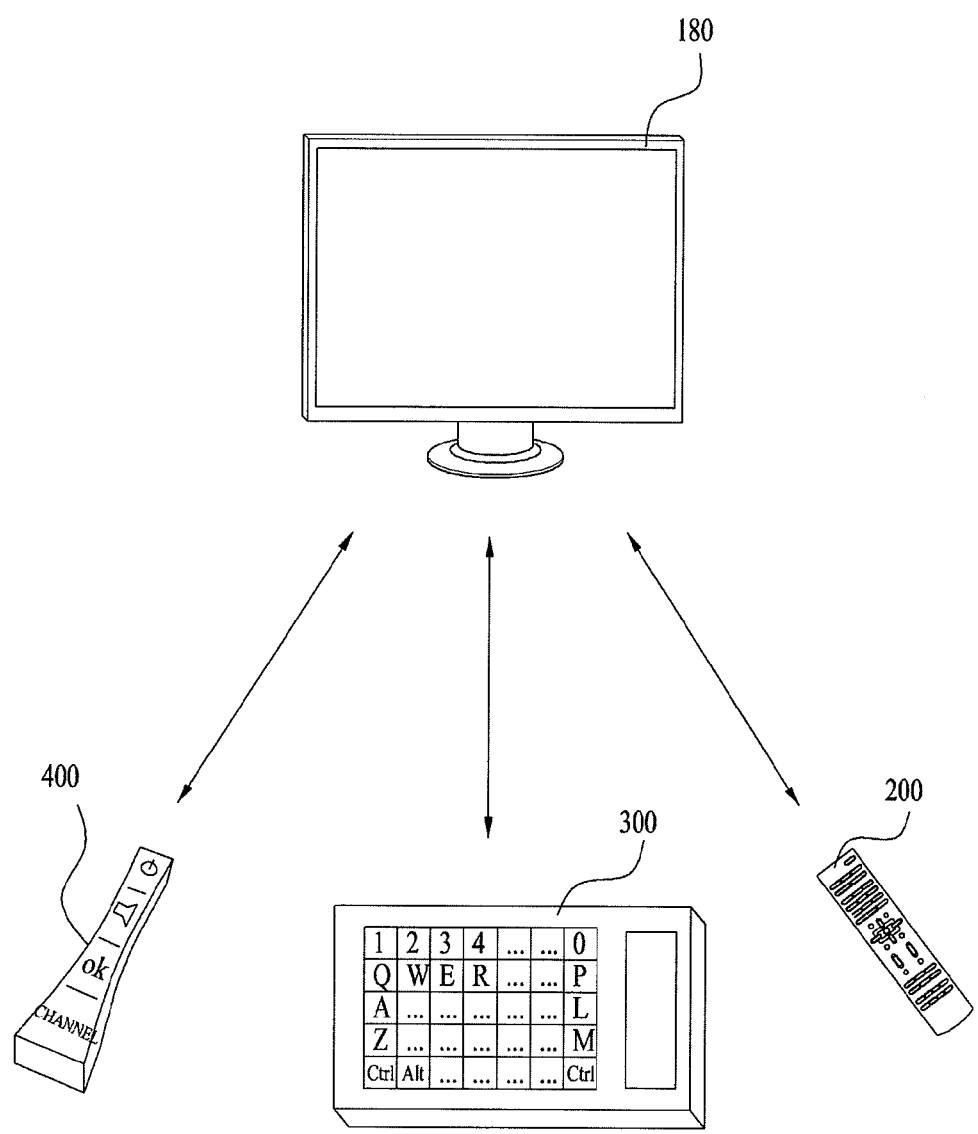
FIG. 3 is a diagram illustrating various user interface means that can control a multimedia device.

FIG. 3 is a diagram illustrating various user interface means that can control a multimedia device.

In accordance with the embodiment of the invention, various user interface devices that enable wire/wireless communication with the multimedia device 100 may be used to implement various operations for carrying out the invention.

Various communication standards such as Bluetooth, Radio Frequency Identification (RFID), infrared Data Association (IrDA), Ultra Wideband (UWB), ZigBee, Digital Living Network Alliance (DLNA), etc., may be used for the communication.

Also, the user interface device may include a remote controller 400 and a remote controller 300 provided with a key board and a touch pad in addition to the conventional remote controller 200.

The conventional remote controller 200 means one provided with a predetermined key button and number key pad.

Also, the remote controller 400 is provided with a gyro sensor therein to sense shaking or rotation of a hand that grips the remote controller 400. If the user moves the remote controller 400 up and down, a pointer moves, whereby the user may easily select a desired broadcast channel or menu list using the pointer.

Also, the remote controller 300 provided with a key board and a touch pad may easily execute text input to the multimedia device through the key board, and may easily input a signal for enlargement and reduction of a photograph or moving picture or motion of the pointer through the touch pad.

Also, according to the embodiment of the invention, the remote controller may include the gyro sensor and a microphone to sense audio together with shaking or turning of the hand, whereby the user may improve exactness in controlling the multimedia device through the remote controller.

Figure 4:
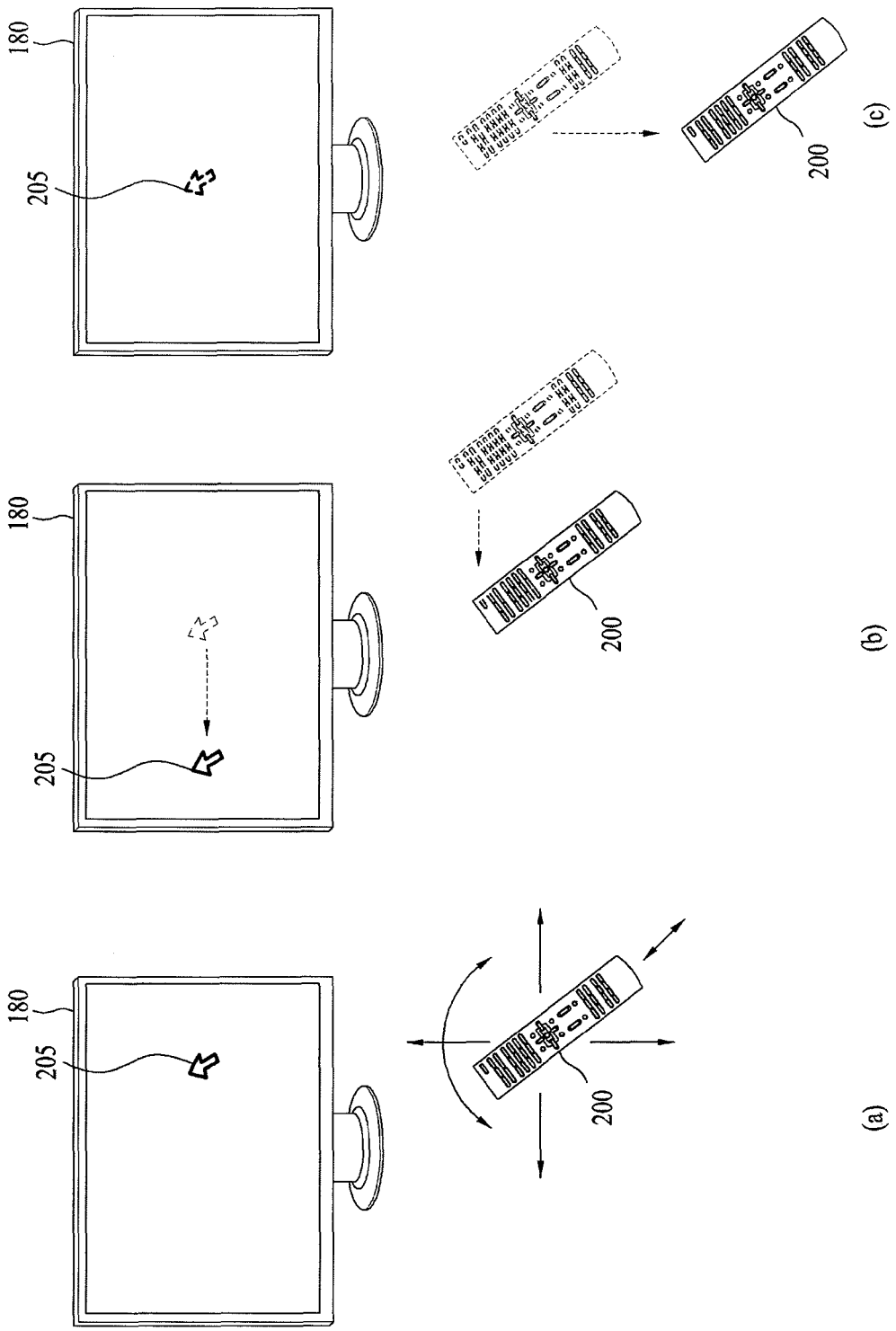
FIG. 4 is a diagram illustrating a method for controlling a multimedia device through any one of the user interface means of FIG. 3.

FIG. 4 is a diagram illustrating a method for controlling a multimedia device through any one of the user interface means of FIG. 3.

As shown in (a) of FIG. 4, a pointer 205 corresponding to the remote controller 200 is displayed in the display module 180.

The user may move or rotate the remote controller 200 in up and down direction, left and right direction (b of FIG. 4) and front and rear direction (c of FIG. 4). The pointer 205 displayed in the display module 180 of the multimedia device 100 corresponds to motion of the remote controller 200. Since the corresponding pointer 205 moves in accordance with motion on 3D space as shown, the remote controller 200 may be referred to as a spatial remote controller.

(b) of FIG. 4 illustrates that, if the user moves the remote controller 200 to the left, the pointer 205 displayed in the display module 180 moves to the left correspondingly.

Information on motion of the remote controller 200, which is sensed by the sensor of the remote controller 200, is transmitted to the multimedia device 100. The multimedia device 100 may obtain a coordinate of the pointer 205 from the information on motion of the remote controller 200. The multimedia device 100 may display the pointer 205 to correspond to the above coordinate.

(c) of FIG. 4 illustrates that the user moves the remote controller 200 to be far away from the display module 180 in a state that the user pushes a specific button of the remote controller 200. In this instance, a zone selected in the display module 180 corresponding to the pointer 205 is displayed through zoom-in. On the contrary, if the user moves the remote controller 200 to be close to the display module 180, the zone selected in the display module 180 corresponding to the pointer 205 is displayed through zoom-out. If the remote controller 200 becomes far away from the display module 180, the selected zone may be subjected to zoom-out. If the remote controller 200 becomes close to the display module 180, the selected zone may be subjected to zoom-in.

In a state that the specific button of the remote controller 200 is pushed, up and down motion and left and right motion may not be recognized. In other words, if the remote controller 200 moves to be far away from or close to the display module 180, front and rear motion may be recognized only without recognition of up and down motion and left and right motion. In a state that the specific button of the remote controller 200 is not pushed, the pointer 205 is only moved in accordance with up and down motion and left and right motion of the remote controller 200.

Motion speed or motion direction of the pointer 205 may correspond to that of the remote controller 200.

In this specification, the pointer refers to an object displayed in the display module 180 to correspond to the operation of the remote controller 200. Accordingly, in addition to an arrow shape illustrated by the pointer 205, various shaped objects may be provided. For example, examples of the pointer may include a dot, cursor, prompt, and thick outline. The pointer may be displayed to correspond to any one point of a horizontal axis and a vertical axis on the display module 180, or may be displayed to correspond to a plurality of points such as line and surface.

Figure 5:
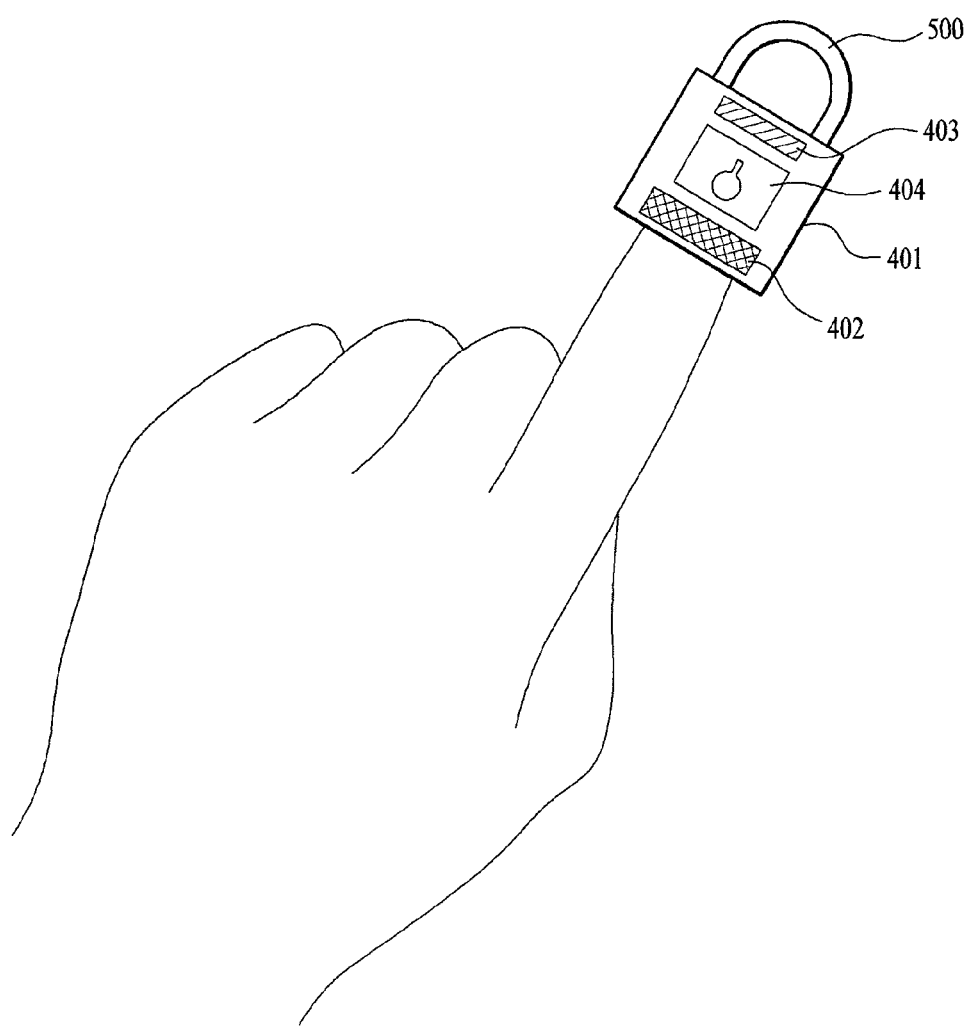
FIG. 5 is a diagram illustrating a remote controller that can be attached to a finger of a user in accordance with the embodiment of the invention.

FIG. 5 is a diagram illustrating a remote controller that can be attached to a finger of a user in accordance with the embodiment of the invention.

According to the embodiment of the invention, the remote controller may include a remote controller that can be attached to a hand of the user.

In particular, as shown in FIG. 5, the remote controller may be attached to a finger 500 of the user to accurately receive gesture and voice of the user.

In other words, the remote controller 401 may be attached to the finger 500 of the user, and may include a wireless communication module 403, a power key 404, and a microphone 420.

The wireless communication module 403 may transmit and receive data to and from the multimedia device through the remote controller 401.

Various communication standards such as Bluetooth, Radio Frequency Identification (RFID), infrared Data Association (IrDA), Ultra Wideband (UWB), ZigBee, Digital Living Network Alliance (DLNA), etc., may be used for the data transmission and reception.

The power key 404 may turn on or off the power of the remote controller 401. Also, in accordance with the embodiment of the invention, the remote controller 401 may transmit a specific signal for enabling the remote controller to the multimedia device through the wireless communication module 403 by pushing the power key 404. As the power key 404 is pushed for a certain time or more, if the specific signal is also continuously input for a certain time or more, the multimedia device may enable the input through the remote controller 401. This will be described in more detail with reference to FIG. 8.

The microphone 402 may receive voice of the user. If the voice is input, the remote controller 401 may transmit information on the input voice to the multimedia device through the wireless communication module 403, search for a specific command from the database through the information on the input voice, and transmit a signal for executing the specific command to the multimedia device through the wireless communication module 403.

Also, the remote controller 401 may further include a sensor unit, a memory unit and a control unit therein to control the multimedia device. The inner structure and detailed operation of the remote controller 401 will be described in more detail with reference to FIG. 6 and FIG. 7.

Through the remote controller as shown, the user may input his/her gesture and voice without any problem, and error operation may be reduced if the user executes a desired operation as a key button of the remote controller is wrongly pushed.

Figure 6:
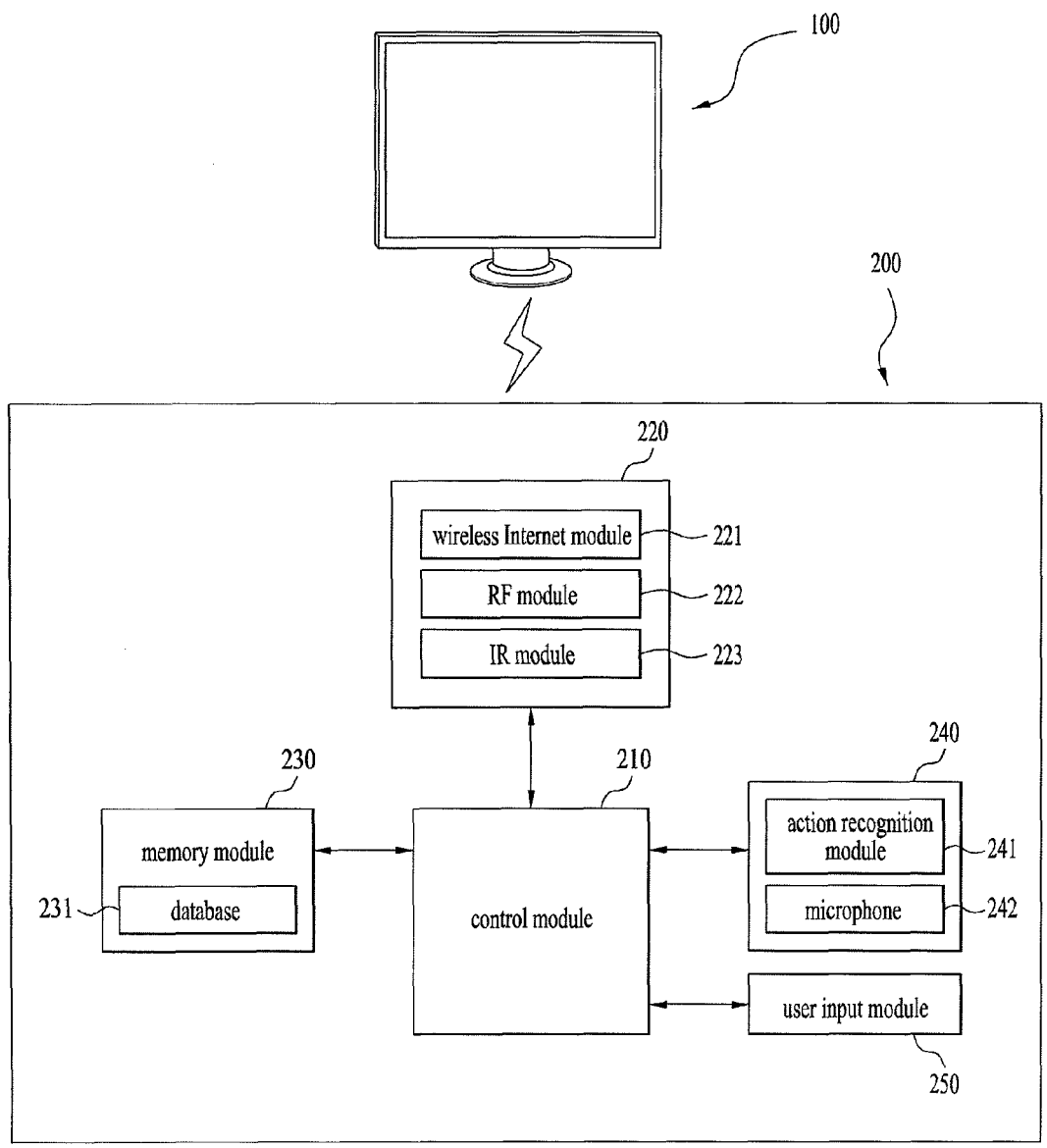
FIG. 6 is a block diagram illustrating the inside of a remote controller that controls a multimedia device according to the embodiment of the invention.

FIG. 6 is a block diagram illustrating the inside of a remote controller that controls a multimedia device according to the embodiment of the invention.

Referring to FIG. 6, the remote controller 200 may include a wireless communication module 220, a sensing module 240, a memory module 230, and a control module 210.

The wireless communication module 220 transmits and receives data to and from the multimedia device in accordance with the aforementioned embodiments of the invention. Among the multimedia devices according to the embodiments of the invention, one multimedia device 100 will be described exemplarily.

In this embodiment, the remote controller 200 may include a radio frequency (RF) module 222 that can transmit and receive data to and from the multimedia device 100 in accordance with the RF communication standard. The remote controller 200 may further include an IR module 223 that can transmit and receive data to and from the multimedia device 100 in accordance with the IR communication standard. Also, the remote controller 200 may further include a wireless Internet module 221 that can transmit or receive data to and from the multimedia device 100 in accordance with the wireless Internet communication standard (wi-fi). Also, the remote controller 200 may include a module that can transmit and receive data to and from the multimedia device 100 in accordance with various communication standards such as Bluetooth, UWB (Ultra Wideband), ZigBee, and DLNA (Digital Living Network Alliance).

In this embodiment, the remote controller 200 transmits data, which includes information on its motion and voice, to the multimedia device 100 through the wireless communication module 220.

Also, the remote controller 200 may receive the signal transmitted from the multimedia device 100 through the wireless communication module 220. Also, the remote controller 200 may transmit a command on power on/off, channel change and volume change to the multimedia device 100 through the wireless communication module 220 to allow the multimedia device 100 to execute a specific operation.

The sensing module 240 may include an action recognition module 241 and a microphone 242.

The action recognition module 241 may include a gyro sensor and an acceleration sensor.

The gyro sensor may sense the information on motion of the remote controller 200. For example, the gyro sensor may sense the information on motion of the remote controller 200 based on x, y and z axes.

The acceleration sensor may sense information on motion speed or a change in the motion speed of the remote controller 200. The sensing module 240 may further include a distance sensor that senses the distance between the display module 180 and the remote controller 200. In other words, the remote controller 200 may acquire direction information and acceleration information of the gesture through the action recognition module 241.

The microphone 242 may receive voice of the user. If the voice is input, the remote controller 200 may transmit information on the input voice to the multimedia device 100 through the wireless communication module, search for a specific command from the database 231 through the information on the input voice and transmit a signal for executing the specific command to the multimedia device 100 through the wireless communication module 220.

The user input module 250 may include a key pad, a button, a touch pad, or a touch screen. The user may input the command related to the multimedia device 100 to the remote controller 200 by manipulating the user input module 250. If the user input module 250 includes a hard key button, the user may input the command related to the multimedia device 100 to the remote controller 200 through a push action of the hard key button. If the user input module 250 includes a touch screen, the user may input the command related to the multimedia device 100 to the remote controller 200 by touching a soft key of the touch screen. Also, the user input module 250 may include various kinds of input means, which can be manipulated by the user, such as a scroll key and a jog key, within the range that does not limit the scope of the invention.

Also, according to the embodiment of the invention, the user input module 250 may include a button for enabling the input through the remote controller 200 in the multimedia device 100. The remote controller 200 may transmit a specific signal for enabling the remote controller 200 to the multimedia device 100 through the wireless communication module 403 by pushing the button. As the button is pushed for a certain time or more, if the specific signal is also continuously input for a certain time or more, the multimedia device 100 may enable the input through the remote controller 200. This will be described in more detail with reference to FIG. 8.

The memory module 230 may store various kinds of programs and application data required for control or operation of the remote controller 200. If the remote controller 200 transmits and receives a signal to and from the multimedia device 100 through the RF module 222, the remote controller 200 and the multimedia device 100 transmit and receive the signal to and from each other through a predetermined frequency band. The control module 210 of the remote controller 200 may store information on the frequency band, through which the signal can be transmitted to and received from the multimedia device 100 paired with the remote controller 200, in the memory module 230, and may refer to the stored information.

Also, according to the embodiment of the invention, the memory module 230 may store the database 231 therein, wherein the database 231 stores mapping data for the specific command corresponding to the gesture and voice input through the sensing module 240.

In other words, the database 231 stores feature information of each of the gesture and voice, and also stores a list of commands that can be executed in the multimedia device to correspond to each feature information. Accordingly, if gesture video of the user is input through the sensing module 240 and feature information is extracted from the input gesture and voice, the remote controller 200 may search for the specific command corresponding to the feature information from the database 231 stored in the memory module 230. Also, the remote controller 200 may transmit the signal for executing the searched specific command to the multimedia device 100 through the wireless communication module 220.

The control module 210 controls all matters related to control of the remote controller 200. The control module 210 may transmit the signal corresponding to predetermined key manipulation of the user input module 250, the signal corresponding to gesture or voice through the remote controller 200, which is sensed by the sensing module 240, or the signal for executing the specific command searched from the database 231 to the multimedia device 100 through the wireless communication module 225.

Also, according to the embodiment of the invention, on the basis of the feature information of the gesture input through the sensing module 240, the control module 210 may search for a specific command matched with the feature information from the database 231 of the memory module 230. If the searched specific command exists, the control module 210 identifies whether voice information mapped into the searched specific command is matched with the feature information of the input voice. If the voice information mapped into the searched specific command is matched with the feature information of the input voice, the control module 210 may transmit the signal for executing the specific command to the multimedia device through the wireless communication module 220.

Also, according to the embodiment of the invention, the remote controller 200 may be attached to the hand of the user as shown in FIG. 5 to receive the gesture and voice of the user without any problem. The remote controller 200 may recognize direction information and acceleration information on motion of the hand of the user as gesture through the sensing module 240.

Figure 7:
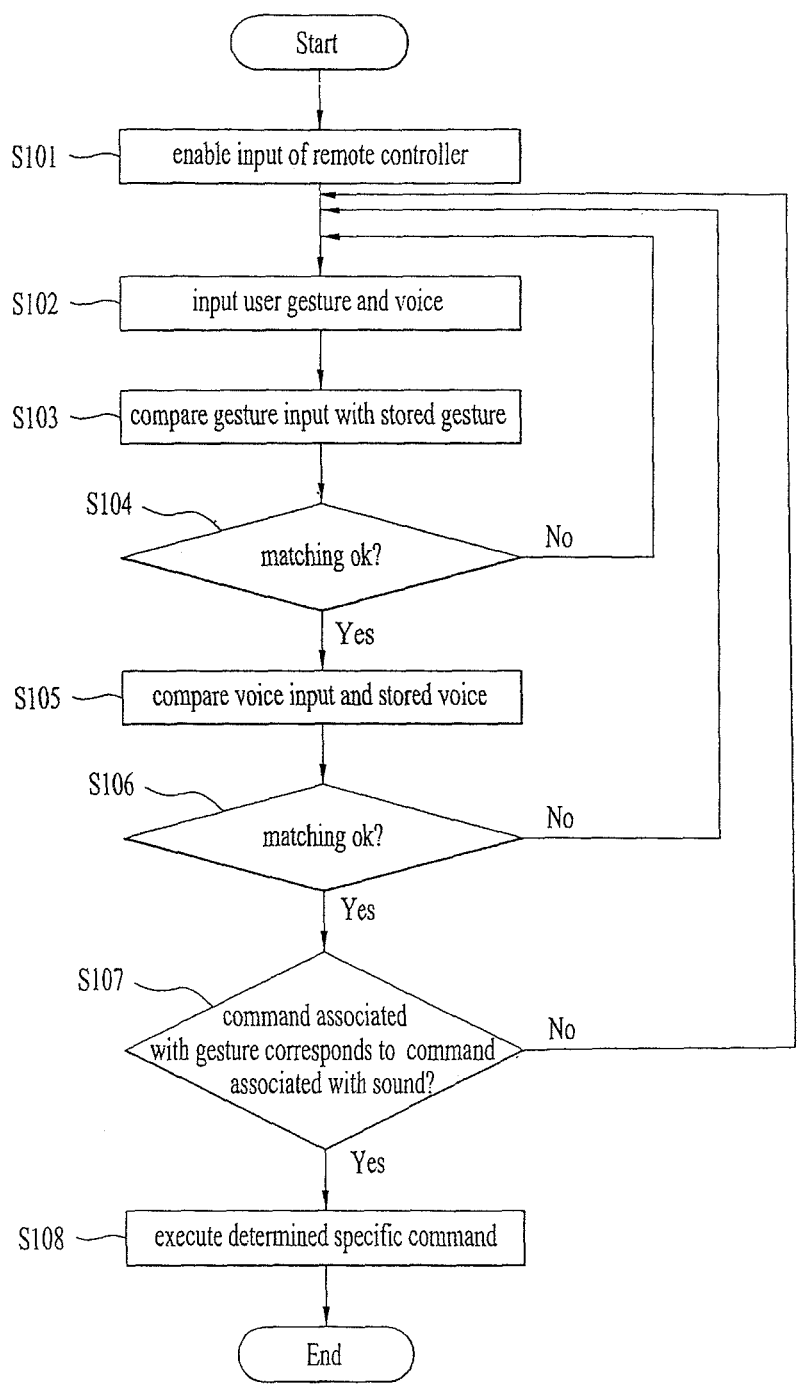
FIG. 7 is a flow chart illustrating a method for controlling a multimedia device through gesture and voice of a user in accordance with the embodiment of the invention.

FIG. 7 is a flow chart illustrating a method for controlling a multimedia device through gesture and voice of a user in accordance with the embodiment of the invention.

In accordance with the embodiment of the invention, the multimedia device enables the input of the remote controller (S101).

The remote controller is a device that can transmit and receive predetermined data to and from the multimedia device through wireless communication, and its example may include various types of devices such as a spatial remote controller and a wireless keyboard.

In particular, in accordance with the embodiment of the invention, an example of the remote controller may include a remote controller that can be attached to a hand of a user. As the remote controller is attached to the hand of the user, it may acquire direction information and acceleration information on motion thereof.

Also, in order to prevent error operation from occurring, the multimedia device may receive data, or gesture and voice from the remote controller only if the input through the remote controller is enabled.

Also, in order to enable the input through the remote controller, if a specific key of the multimedia device or the remote controller is turned on or a selection signal of the specific key is input for a certain time or more, or if the remote controller is located in a specific location for a certain time or more, the multimedia device may be set to enable the input through the remote controller. Accordingly, an input of a gesture and a voice is enabled. This will be described in more detail with reference to FIG. 8.

Next, gesture and voice are input through the remote controller (S102). Accordingly, the gesture and the voice are received. In embodiments of the invention, sensing or detection of the gesture and/or the voice is also referred to as receiving.

The gesture and voice may be input from the user to the remote controller through the action recognition module and the microphone as shown in FIG. 6, wherein the action recognition module may include a gyro sensor.

Then, the input gesture is compared with a gesture mapped into a command that can be executed in the multimedia device, by the database on the basis of feature information of the input gesture (S103), whereby it is determined whether the input gesture is matched with the gesture stored in the database (S104). Thus, a command associated with the input or received gesture is identified.

Figure 12:
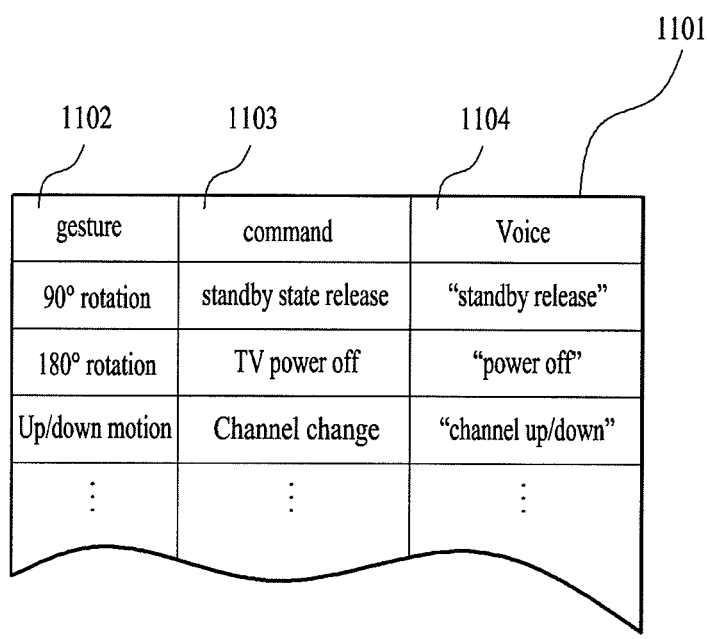
FIG. 12 is a diagram illustrating a database that stores mapping data of gesture and voice to execute a specific operation in accordance with the embodiment of the invention.

The multimedia device, as shown in FIG. 12, may map a specific gesture into a specific voice per command that can be executed therein, and may store the mapped data.

Accordingly, the multimedia device may extract direction information and acceleration information of the input gesture as feature information and search for the database on the basis of the extracted direction information and acceleration information to determine whether the input gesture is matched with the gesture information of the specific command stored in the database.

Next, if the input gesture is matched with the stored gesture, voice information mapped into the searched specific command is compared with feature information of the input voice (S105) to determine whether they are matched with each other (S106). Thus, a command associated with the input or received sound is identified.

The multimedia device may extract waveform information of the input voice through the remote controller and search for the extracted waveform information and waveform information of voice mapped into the searched specific command through the database to determine whether the input voice is matched with the stored voice.

In other words, not only the input gesture is compared with the stored gesture to search for the specific command that can be executed in the multimedia device but also the input voice is identified to prevent a command, which is not desired by the user, from being executed.

Then, the command associated with the gesture and the command associated with the sound are compared. (S107)

Next, a specific command or a function associated with the first or second command is performed when the comparison indicates that the first command corresponds to the second command (S108).

In other words, the specific command is determined by the search step through the gesture input through the remote controller and the identifying step through the voice input through the remote controller, and then is executed by the multimedia device, whereby the multimedia device may be controlled through the remote controller.

Also, according to the embodiment of the invention, after the determined specific command or function is executed, if loss occurs in the operation currently performed by the multimedia device, a warning message is output. The determined specific command is executed only if a confirmation command on the warning message is received, whereby the operation may be performed by the multimedia device without any problem. This will be described in more detail with reference to FIG. 10.

According to the aforementioned description, the multimedia device receives only the signal corresponding to gesture and voice from the remote controller and searches for and determines the specific command. However, if both the database and the sensing module are provided in the remote controller as shown in FIG. 6 and gesture and voice are input to the remote controller, the control module of the remote controller may execute the search step of the specific command through the input gesture and the identifying step of the specific command through the input voice, through the database, and if the specific command is determined, the control module of the remote controller may transmit only the signal for executing the determined specific command to the multimedia device. In other embodiments, instead of the remote controller, the multimedia device may perform the method of FIG. 7.

Figure 8:
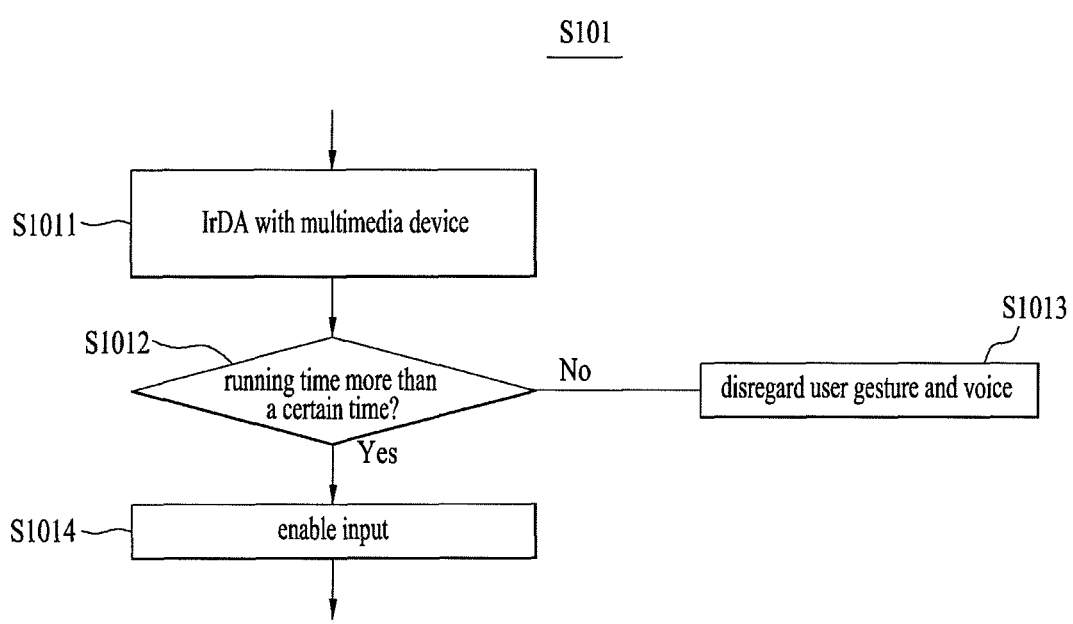
FIG. 8 is a detailed diagram illustrating a step of enabling an input of a remote controller in FIG. 7.

FIG. 8 is a detailed diagram illustrating the step of enabling the input of the remote controller in FIG. 7.

According to the embodiment of the invention, the multimedia device may include the step of enabling the input through the remote controller to prevent error operation from occurring.

Also, the remote controller may input the enable signal by transmitting and receiving a specific signal to and from the multimedia device through infrared data association (IrDA). Since a module for IrDA may generally be provided in the remote controller and may have a compact size, it may be used as an input means of the enable signal.

Accordingly, if a specific key of the remote controller is input (e.g., pressed) or the remote controller is located at a specific location for IrDA with the multimedia device, the remote controller executes IrDA by transmitting specific data to the multimedia device (S1011).

Next, the multimedia device determines a running time of the IrDA and enables the input through the remote controller if the running time of the IrDA is more than a certain time (S1014).

In other words, even though the specific key of the remote controller is input or the remote controller is located at the specific location for IrDA with the multimedia device, the specific key or the specific location may be the input or the motion of the remote controller, which is not desired by the user. Accordingly, the multimedia device may recognize the enable signal only if the running time of the IrDA is more than a certain time.

Also, the running time may be varied in accordance with setting of the user.

On the other hand, if the running time is less than a certain time, the multimedia device disregards the gesture and voice input through the remote controller (S1013).

Figure 9:
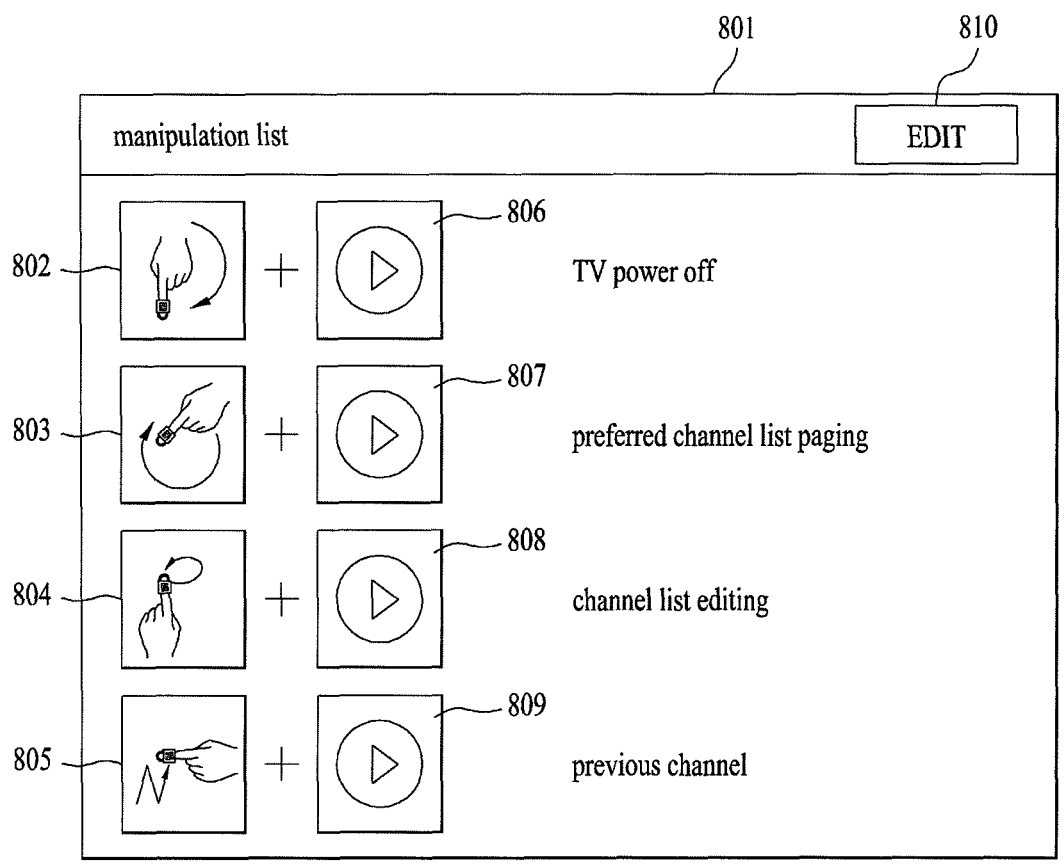
FIG. 9 is a diagram illustrating a display screen of a menu that includes a list of operations corresponding to gesture and voice input in accordance with the embodiment of the invention.

FIG. 9 is a diagram illustrating a display screen of a menu that includes a list of operations corresponding to gesture and voice input in accordance with the embodiment of the invention.

According to the embodiment of the invention, the multimedia device may provide mapping information on a specific command mapped into gesture and voice stored in the multimedia device through a manipulation list menu 801.

In other words, the multimedia device may map a specific command, which can be executed therein, per gesture and voice, and may store the mapped data. If gesture and voice information is received from the remote controller through the user interface module of the multimedia device, the multimedia device may extract feature information of the received gesture and search for the stored mapping data to search for a specific command. If the specific command is searched, the multimedia device may determine whether the voice information mapped into the searched specific command is matched with the feature information of the input voice, thereby determining whether the searched specific command is that particular command which the user desires to execute.

The manipulation list menu 801 may include information on the mapped gesture as images 802, 803, 804 and 805, and may include information on the mapped voice as icons 806, 807, 808 and 809 for playing the voice or sound.

Accordingly, referring to FIG. 9, it may be recognized that the gesture 802 for motion of the finger from the upper to the lower is mapped into a command for power off of the multimedia device, the gesture 803 for drawing a curve using the finger is mapped into a command for paging a preferred channel list from the multimedia device, the gesture 804 drawing a small circle using the finger is mapped into a command for editing a channel list in the multimedia device, and the gesture 805 for up and down recursive motion of the finger is mapped into a command returning to a previous channel in the multimedia device.

Also, the gesture of the user may include various gestures through various parts of the user body such as arm, leg and head as well as hand or finger.

Also, the user may input a selection signal of each of the icons 806 to 809, whereby the multimedia device may play voice data mapped into each specific command.

Also, the manipulation list menu 801 may include a menu 810 for mapping new gesture and voice into a specific command. Accordingly, if a selection signal of the menu 810 is received from the user, the multimedia device may execute a mapping step for gesture and voice by displaying a menu screen of FIG. 11 below.

Figure 10:
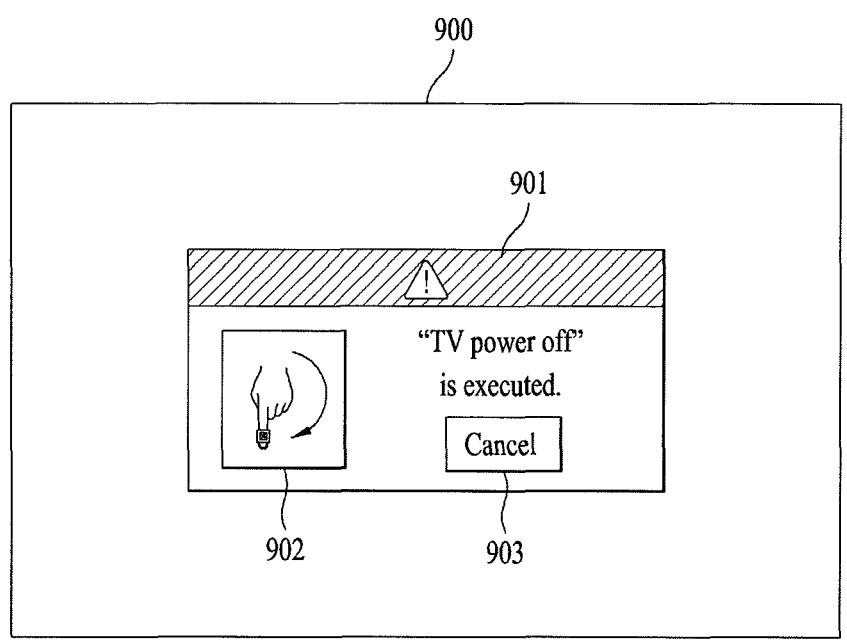
FIG. 10 is a diagram illustrating a display screen that includes a warning message in accordance with the embodiment of the invention.

FIG. 10 is a diagram illustrating a display screen 900 that includes a warning message in accordance with the embodiment of the invention.

According to the embodiment of the invention, after a predetermined gesture and voice are input from the user, if the multimedia device executes a specific command corresponding to the input gesture and voice, it may display a confirmation message 901 as to whether it will execute the specific command.

In particular, if the specific command corresponds to action that may bring loss of data in respect of contents or service currently used by the multimedia device, the multimedia device may output the confirmation message 901 to prevent loss of data from occurring.

For example, if the specific command corresponding to the input gesture is a power-off action of the multimedia device, since the operation currently performed by the multimedia device ends, the multimedia device may display the confirmation message 901 to request the user to confirm whether the user will turn off the multimedia device.

Also, the confirmation message 901 may include information on the specific operation, information 902 on the gesture input by the user, and a cancellation menu 903 for canceling the input of the gesture.

In other words, if the user intends to cancel the specific operation by identifying the input gesture 902 and the specific operation, he/she may select the cancellation menu 903 to cancel the specific operation.

Also, the confirmation message 901 may be displayed in a predetermined zone where the contents or service is not displayed, in an opaque color so as not to disturb a display screen of the contents or service currently used by the multimedia device.

As a result, if the gesture and voice input to the multimedia device are recognized in error or if the user inputs the gesture or voice in error, unwanted operation may be prevented from being executed.

Figure 11:
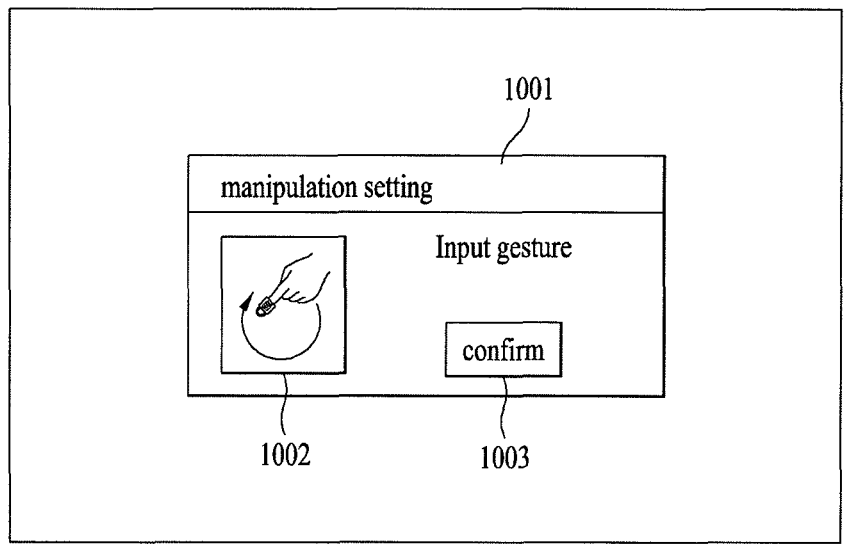
FIG. 11 is a diagram illustrating a display screen that includes an input menu of gesture and voice to execute a specific operation in accordance with the embodiment of the invention.
Figure 11:
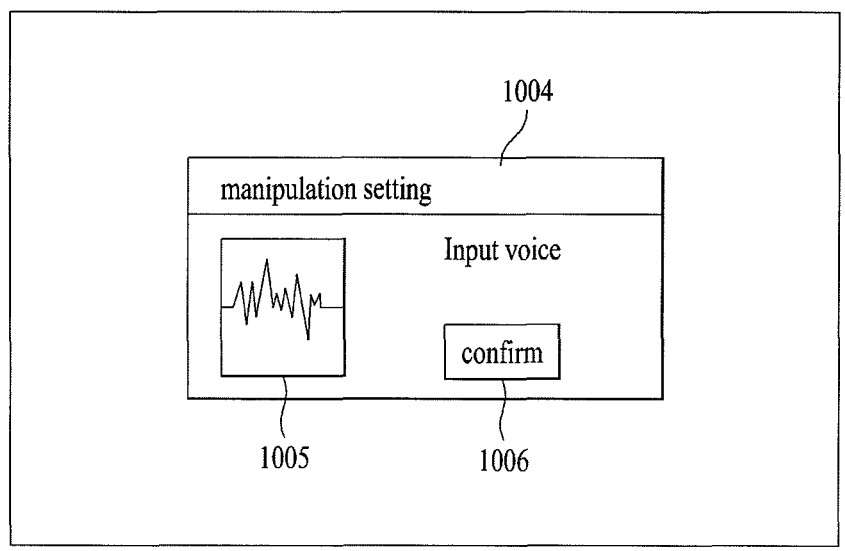

FIG. 11 is a diagram illustrating a display screen that includes an input menu of gesture and voice to execute a specific operation in accordance with the embodiment of the invention.

According to the embodiment of the invention, the user may set random gesture and voice as an input means for executing a predetermined service in the multimedia device or receiving a service.

If a selection signal or a hot key input signal of a menu for setting random gesture and voice is input from the user in a state that a list of commands that can be executed in the multimedia device is displayed, or if a selection signal or a hot key input signal of a menu for setting random gesture and voice is input from the user in a state that a predetermined service or content is currently used by the multimedia device, the multimedia device may display a gesture registration menu 1001.

The gesture registration menu 1001 may include a gesture image 1002 input by the user to set the input means, and a confirmation menu 1003 for the input gesture. In other words, after inputting a random gesture, the user determines whether any error operation occurs (or an unintended gesture is captured) in the gesture image 1002. If the error operation occurs in the gesture image 1002, the user may display a voice registration menu 1004 by selecting the confirmation menu 1003.

If the voice registration menu 1004 is displayed, the user may input random voice through the remote controller or the sensing module of the multimedia device. Also, the multimedia device may provide the user with information on a waveform of the input voice through a voice confirmation window 1005 while the random voice is being input.

Also, after the voice is input, if a selection signal of the voice confirmation window 1005 is input from the user, the multimedia device may play the input voice.

Also, the voice registration menu 1004 may include a confirmation menu 1005 for the input voice. In other words, after inputting random voice, the user determines whether any error operation occurs in the input voice, through the voice confirmation window 1005. If the error operation does not occur, the user may map the input gesture and voice into a predetermined function or service of the multimedia device and store the mapped data in the database by selecting the confirmation menu 1006.

Also, the gesture registration menu 1001 and the voice registration menu 1004 may include a function list of the multimedia device, which will be mapped into the input gesture or voice, and may receive the selection signal from the user.

As described above the user may designate desired gesture and voice in a desired function or service, whereby user convenience in manipulation of the multimedia device may be improved.

FIG. 12 is a diagram illustrating a database 1101 that stores mapping data of gesture and voice to execute a specific operation in accordance with the embodiment of the invention.

According to the embodiment of the invention, the database 1101 may store mapping data of gesture 1102 and voice 1004 per command that can be executed in the multimedia device.

Referring to FIG. 12, the database 1101 may store data indicating that gesture rotating the remote controller at 90 degree and voice corresponding to "standby release" should be input through the remote controller to release a standby state of the multimedia device, data indicating that gesture rotating the remote controller at 180 degree and voice corresponding to "power off" should be input through the remote controller to turn off the power of the multimedia device, and data indicating that gesture moving the remote controller up and down and voice corresponding to "channel up/down" should be input through the remote controller to change a channel currently used by multimedia device.

In other words, since the database may store mapping data of gesture and voice for a specific command that can be executed in the multimedia device, if gesture and voice information is received from the remote controller, the multimedia device may search for the specific command by using feature information of the received gesture, and may identify whether the searched specific command is that command which the user desires to execute, by using feature information of the input voice. Accordingly, exactness and reliability can be improved in the operation through the remote controller.

Also, the database 1101 may be stored in the memory module of the multimedia device in accordance with one embodiment of the invention, or may be stored in the memory module of the remote controller in accordance with another embodiment of the invention.

If the database 1101 is stored in the memory module of the multimedia device, the multimedia device receives information on gesture and voice from the remote controller and the control module of the multimedia device executes a specific command by searching for and identifying the specific command in accordance with one embodiment of the invention.

On the other hand, if the database 1101 is stored in the memory module of the remote controller, the control module of the remote controller searches for and identifies a specific command in accordance with another embodiment of the invention and executes the searched specific command by transmitting a signal for executing the searched specific command to the multimedia device.

The multimedia device and the operation method thereof according to the invention may be configured by selective combination of all or some of the aforementioned embodiments without limited application of the embodiments, whereby various modifications can be made in the embodiments.

The operation method of the multimedia device according to the invention can be implemented in a recording medium, which can be read by a processor provided in the multimedia device, as a code that can be read by the processor. The recording medium that can be read by the processor includes all kinds of recording media in which data that can be read by the processor are stored. Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor can be stored and implemented in a distributive mode.

It will be apparent to those skilled in the art that the invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for controlling a multimedia device, the method comprising:
    enabling an input of a gesture and a voice;
    receiving the gesture and the voice;
    identifying a first command associated with the received gesture;
    identifying a second command associated with the received voice;
    comparing the first command and the second command to each other; and
    performing a function associated with the first or second command when the comparing indicates that the first command corresponds to the second command,
    wherein the input of the gesture and the voice is enabled through an enable signal of a remote controller,
    wherein when a running time of the enable signal is more than a reference time, the input of the gesture and the voice is enabled, and wherein when a running time of the enable signal is less than the reference time, the input of the gesture and the voice is disregarded.

2. The method according to claim 1, wherein the identifying of the first command includes searching for the function, which can be executed in the multimedia device, from a database based on feature information of the gesture, and determining whether gesture information matches the feature information of the gesture; and the identifying of the second command includes searching for the function, which can be executed in the multimedia device, from the database based on feature information of the voice, and determining whether voice information matches the feature information of the voice.

3. The method according to claim 1, wherein the multimedia device performs the identifying of the first and second commands and the comparing step after receiving the gesture and the voice.

4. The method according to claim 3, wherein the receiving of the gesture and the voice includes:

receiving gesture information through a camera of the multimedia device; and receiving voice information through a microphone of the multimedia device.

5. The method according to claim 2, wherein the determining of whether the gesture information matches the feature information of the gesture includes:

extracting direction information of the gesture; and determining that the function is associated with the extracted direction information from the database, and the determining of whether the voice information matches the feature information of the voice includes:

extracting waveform information of the voice; and determining that the function is associated with the extracted waveform information.

6. A multimedia device that can be controlled by a remote controller, the multimedia device comprising:

a user interface module configured to receive a gesture and a voice;

a memory module configured to store a first command and a second command; and a control module configured to identify the first command associated with the received gesture, identify the second command associated with the received voice, compare the first command and the second command to each other, and perform a function associated with the first or second command when the comparison indicates that the first command corresponds to the second command, wherein the control module enables an input of the gesture and the voice through an enable signal of the remote controller before receiving the gesture and the voice, wherein when a running time of the enable signal is more than a reference time, the input of the gesture and the voice is enabled, and wherein when a running time of the enable signal is less than the reference time, the input of the gesture and the voice is disregarded.

7. The multimedia device according to claim 6, wherein the control module identifies the first command by searching for the function, which can be executed in the multimedia device based on feature information of the gesture, and determines whether gesture information matches the feature information of the gesture, and wherein the control module identifies the second command by searching for the function, which can be executed in the multimedia device based on feature information of the voice, and determines whether voice information matches the feature information of the voice.

8. The multimedia device according to claim 6, wherein the control module performs the identification of the first and second commands, and the comparison after receiving the gesture and the voice.

9. The multimedia device according to claim 8, wherein the multimedia device receives the gesture through a camera of the multimedia device, and receives the voice information through a microphone of the multimedia device.

10. The method according to claim 7, wherein the determination of whether the gesture information matches the feature information of the gesture includes:

extracting direction information of the gesture; and determining that the function is associated with the extracted direction information, and the determination of whether the voice information matches the feature information of the voice includes:

extracting waveform information of the voice; and determining that the function is associated with the extracted waveform information.

11. A remote controller that can control a multimedia device, the remote controller comprising:

a wireless communication module configured to transmit and receive data to and from the multimedia device;

a sensing module configured to receive a gesture and a voice;

a memory module configured to store a first command and a second command; and a control module configured to identify the first command associated with the received gesture, identify the second command associated with the received voice, compare the first command and the second command to each other, and perform a function associated with the first or second command when the comparison indicates that the first command corresponds to the second command, wherein the control module enables an input of the gesture and the voice before receiving the gesture and the voice, wherein the input of the gesture and the voice is enabled through an enable signal of a remote controller, wherein when a running time of the enable signal is more than a reference time, the input of the gesture and the voice is enabled, and wherein when a running time of the enable signal is less than the reference time, the input of the gesture and the voice is disregarded.

* * * * *